(12) United States Patent
Iwata et al.

(10) Patent No.: US 9,716,823 B2
(45) Date of Patent: Jul. 25, 2017

(54) IMAGE PICKUP APPARATUS, IMAGE PICKUP SYSTEM, AND METHOD OF DRIVING IMAGE PICKUP APPARATUS

(71) Applicant: CANON KABUSHIKI KAISHA, Tokyo (JP)

(72) Inventors: Koichiro Iwata, Kawasaki (JP); Hiroo Akabori, Fujisawa (JP); Hiroyuki Morita, Ebina (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/962,050

(22) Filed: Dec. 8, 2015

(65) Prior Publication Data

US 2016/0191786 A1 Jun. 30, 2016

(30) Foreign Application Priority Data

Dec. 26, 2014 (JP) ................. 2014-265516

(51) Int. Cl.
| | |
|---|---|
| *G02B 13/16* | (2006.01) |
| *H04N 5/225* | (2006.01) |
| *H04N 5/232* | (2006.01) |
| *H04N 5/369* | (2011.01) |
| *H04N 5/378* | (2011.01) |

(52) U.S. Cl.
CPC ....... *H04N 5/23212* (2013.01); *H04N 5/3696* (2013.01); *H04N 5/378* (2013.01)

(58) Field of Classification Search
CPC ... H04N 5/23212; H04N 5/378; H04N 5/3696
USPC ................ 348/335, 340, 345, 348, 350, 352
See application file for complete search history.

(56) References Cited

U.S. PATENT DOCUMENTS

| | | | |
|---|---|---|---|
| 7,741,593 B2 | 6/2010 | Iwata et al. | |
| 8,013,369 B2 | 9/2011 | Iwata et al. | |
| 8,081,245 B2 | 12/2011 | Itano et al. | |
| 8,159,577 B2 | 4/2012 | Iwata et al. | |
| 8,598,901 B2 | 12/2013 | Hiyama et al. | |
| 8,670,058 B2 | 3/2014 | Hayashi et al. | |
| 8,885,082 B2 | 11/2014 | Noda et al. | |

(Continued)

FOREIGN PATENT DOCUMENTS

| | | |
|---|---|---|
| JP | 2010-074243 | 4/2010 |
| JP | 2013-183279 | 9/2013 |

*Primary Examiner* — Yogesh Aggarwal
(74) *Attorney, Agent, or Firm* — Fitzpatrick, Cella, Harper & Scinto

(57) ABSTRACT

Provided is an image pickup apparatus, including a plurality of microlenses, a plurality of image pickup rows being configured to output a signal for generating an image a distance measurement row being configured to output a focus detection signal a plurality of signal processing units, and a control unit. The control unit is configured to control the plurality of image pickup rows to perform a first operation of reading signals to the plurality of signal processing units; control, before or after the first operation, the distance measurement row to perform a second operation of reading signals to the plurality of signal processing units; control the plurality of signal processing units to be in an operating state in one of the first and second operations; and control a part of the plurality of signal processing units to be in an operation-restricted state in another of the first and second operations.

6 Claims, 9 Drawing Sheets

(56) References Cited

U.S. PATENT DOCUMENTS

| | | |
|---|---|---|
| 8,928,786 B2 | 1/2015 | Iwata et al. |
| 9,077,921 B2 | 7/2015 | Hashimoto et al. |
| 9,118,857 B2 | 8/2015 | Iwata et al. |
| 2009/0135289 A1* | 5/2009 | Kusaka ................ G02B 3/0056 348/345 |

* cited by examiner

ADDITION READING OF IMAGE PICKUP ROWS

BLOCK READING OF DISTANCE MEASUREMENT ROWS

IMAGE PICKUP APPARATUS, IMAGE PICKUP SYSTEM, AND METHOD OF DRIVING IMAGE PICKUP APPARATUS

BACKGROUND OF THE INVENTION

Field of the Invention

The present invention relates to an image pickup apparatus, an image pickup system, and a method of driving an image pickup apparatus, which are capable of outputting an image pickup signal and a distance measurement signal.

Description of the Related Art

In recent years, there have been devised image pickup apparatus capable of outputting an image pickup signal and a distance measurement signal. For example, in Japanese Patent Application Laid-Open No. 2010-74243, there is disclosed an image pickup apparatus including image pickup pixel rows and distance measurement pixel rows. The image pickup apparatus is configured to perform interlaced scanning of pixel signals by continuously driving only the image pickup pixel rows in a first scanning period and then continuously driving only the distance measurement pixel rows in a second scanning period.

The image pickup apparatus disclosed in Japanese Patent Application Laid-Open No. 2010-74243 is not configured to control electric power for driving the image pickup pixel rows and the distance measurement pixel rows. No attempt is made to reduce current consumption.

SUMMARY OF THE INVENTION

According to one embodiment of the present invention, there is provided a method of driving an image pickup apparatus, the image pickup apparatus including: a plurality of microlenses; a plurality of image pickup rows, in each of which a plurality of image pickup pixels are arranged, each of the plurality of image pickup pixels including a photoelectric conversion element that is arranged correspondingly to one of the plurality of microlenses, and being configured to output a signal for generating an image; a distance measurement row, in which a plurality of focus detection pixels are arranged, each of the plurality of focus detection pixels including a photoelectric conversion element that is arranged correspondingly to one of the plurality of microlenses and that has a smaller light receiving area than the photoelectric conversion element included in the image pickup pixel, and being configured to output a focus detection signal; and a plurality of signal processing units, to each of which signals of the plurality of focus detection pixels and the plurality of image pickup pixels are output, the method including: performing a first operation of reading signals from the plurality of image pickup rows to the plurality of signal processing units; performing, before or after the first operation, a second operation of reading signals from the distance measurement row to the plurality of signal processing units; controlling the plurality of signal processing units to be in an operating state in one of the first operation and the second operation; and controlling a part of the plurality of signal processing units to be in an operation-restricted state in another of the first operation and the second operation.

Further, according to another embodiment of the present invention, there is provided an image pickup apparatus, including: a plurality of microlenses; a plurality of image pickup rows, in each of which a plurality of image pickup pixels are arranged, each of the plurality of image pickup pixels including a photoelectric conversion element that is arranged correspondingly to one of the plurality of microlenses, and being configured to output a signal for generating an image; a distance measurement row, in which a plurality of focus detection pixels are arranged, each of the plurality of focus detection pixels including a photoelectric conversion element that is arranged correspondingly to one of the plurality of microlenses and that has a smaller light receiving area than the photoelectric conversion element included in the image pickup pixel, and being configured to output a focus detection signal; a plurality of signal processing units, to each of which signals of the plurality of focus detection pixels and the plurality of image pickup pixels are output; and a control unit, the control unit being configured to: control the plurality of image pickup rows to perform a first operation of reading signals to the plurality of signal processing units; control, before or after the first operation, the distance measurement row to perform a second operation of reading signals to the plurality of signal processing units; control the plurality of signal processing units to be in an operating state in one of the first operation and the second operation; and control a part of the plurality of signal processing units to be in an operation-restricted state in another of the first operation and the second operation.

Further features of the present invention will become apparent from the following description of exemplary embodiments with reference to the attached drawings.

DESCRIPTION OF THE EMBODIMENTS

Figure 1:
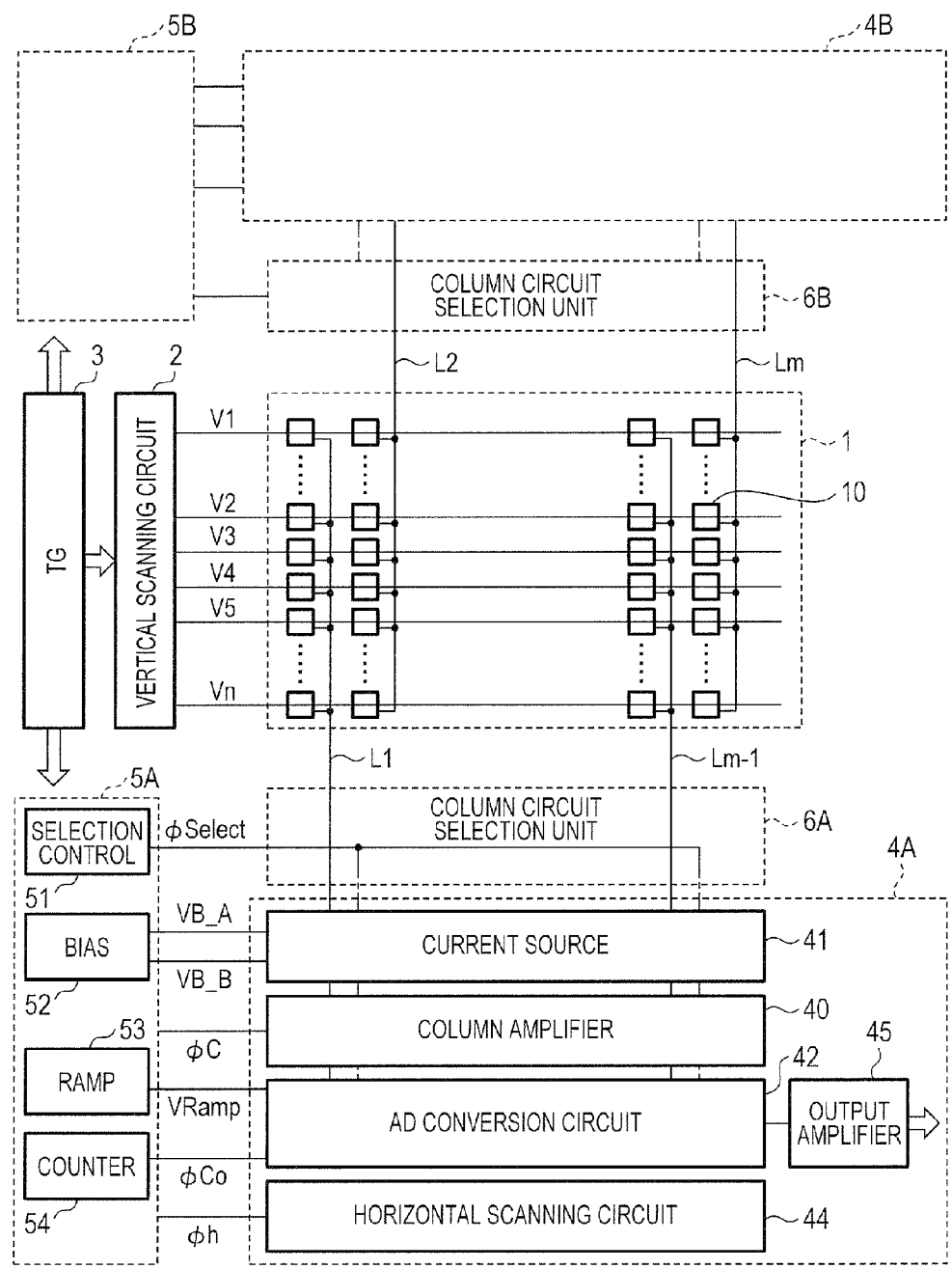
FIG. 1 is a block diagram of an image pickup apparatus according to a first embodiment of the present invention.

Embodiments of the present invention are now described with reference to the accompanying drawings. In the drawings of each of the embodiments, components having the same functions are denoted by the same reference symbols, and overlapping descriptions thereof are sometimes omitted.

(First Embodiment)

FIG. 1 is a block diagram of an image pickup apparatus according to a first embodiment of the present invention. The image pickup apparatus in the first embodiment includes a pixel region 1, a vertical scanning circuit 2 configured to scan pixels, and peripheral circuits therefor. The peripheral circuits include signal processing circuits 4A and 4B configured to process pixel signals, a timing generator (TG) 3 configured to control an overall operation of the image pickup apparatus, column control circuits 5A and 5B configured to control the signal processing circuits 4A and 4B, and column circuit selection units 6A and 6B configured to select an operating state or an operation-restricted state of each column circuit of the signal processing circuits 4A and 4B.

In the pixel region 1, a plurality of unit pixels 10 are arranged in a two-dimensional matrix pattern in the row direction and the column direction. The pixel region 1 of FIG. 1 includes the unit pixels 10 in n rows and m columns, but a limited number of the unit pixels 10 are illustrated in FIG. 1 for simple description. As used herein, the row direction refers to the horizontal direction in the figure and the column direction refers to the vertical direction in the figure. The pixel region 1 includes a distance measurement row, in which focus detection pixels configured to output focus detection signals are arranged, and a plurality of image pickup rows, in each of which image pickup pixels configured to output signals for generating an image are arranged. Some of the unit pixels 10 in the pixel region 1 may be shielded from light as optical black (OB) pixels.

The vertical scanning circuit 2 reads and scans the pixel region 1 in response to a control signal from the TG 3. Specifically, pixel rows each formed of a plurality of unit pixels 10 in the horizontal direction are supplied with horizontal drive signals V1 to Vn from the vertical scanning circuit 2, and photoelectrically-converted signals are read from the unit pixels 10. Each of the horizontal drive signals V1 to Vn includes a plurality of drive signals φres, φtx, and φsel as described later. Outputs of a plurality of unit pixels 10 in the column direction are connected in common to a corresponding one of vertical signal lines L1 to Lm. The vertical signal lines L1 to Lm include vertical signal lines L1, L3, . . . , Lm−1 for odd-numbered columns and vertical signal lines L2, L4, . . . , Lm for even-numbered columns. The vertical signal lines L1, L3, . . . , Lm−1 for odd-numbered columns are input to the signal processing circuit 4A arranged below the pixel region 1 in FIG. 1, and the vertical signal lines L2, L4, Lm for even-numbered columns are input to the signal processing circuit 4B arranged above the pixel region 1 in FIG. 1. As used herein, V1 to Vn sometimes refer to rows and L1 to Lm sometimes refer to columns.

The TG 3 functions as a control unit, and outputs control signals based on a reference clock to the vertical scanning circuit 2 and the column control circuits 5A and 5B to control the operations of the vertical scanning circuit 2 and the column control circuits 5A and 5B. The signal processing circuits 4A and 4B have the same configuration and function. The column control circuits 5A and 5B configured to control the signal processing circuits 4A and 4B also have the same configuration and function. The column circuit selection units 6A and 6B also have the same configuration and function. In this embodiment, the signal processing circuits 4A and 4B, the column control circuits 5A and 5B, and the column circuit selection units 6A and 6B are arranged for odd-numbered rows and even-numbered rows, respectively, thus enabling signals to be read from the pixel region 1 at high speed. The signal processing circuit 4A, the column control circuit 5A, and the column circuit selection unit 6A configured to process signals in odd-numbered rows are mainly described below.

The signal processing circuit 4A includes a current source 41, a column amplifier 40, an AD conversion circuit 42, a horizontal scanning circuit 44, and an output amplifier 45.

The current source 41, the column amplifier 40, the AD conversion circuit 42, and the horizontal scanning circuit 44 are formed of a column circuit (signal processing unit) arranged for each column. In other words, the signal processing circuit 4A includes a plurality of column circuits, and each of the column circuits includes a part of the current source 41 for one column, a part of the column amplifier 40 for one column, a part of the AD conversion circuit 42 for one column, and a part of the horizontal scanning circuit 44 for one column. As used herein, the vertical signal line L and the circuits for one column of the unit pixels 10 are sometimes collectively referred to as "column circuit".

The current source 41 includes current sources for respective column signal lines, and functions as a load of an amplifier MOS transistor in the unit pixel 10. The column amplifier 40 includes amplifier circuits for respective columns, and amplifies signals output from the unit pixels 10 via the vertical signal lines L1 to Lm−1. The AD conversion circuit 42 includes a comparator circuit configured to compare a signal from the column amplifier 40 and a ramp signal from a RAMP circuit 53, and a memory configured to hold a value counted until the result of comparison is inverted as a digital signal. The horizontal scanning circuit 44 includes a shift register, and sequentially scans and outputs digital signals for respective columns to the output amplifier 45.

The column control circuit 5A includes a selection control circuit 51, a bias circuit 52, the RAMP circuit 53, and a counter signal supply circuit 54. The bias circuit 52 generates bias voltages VB_A and VB_B for the current circuits for respective columns in the signal processing circuit 4A. Based on a control signal φSelect from the selection control circuit 51, the column circuit selection unit 6A selectively supplies any one of the two bias voltages VB_A and VB_B to the current circuits for respective columns. The current circuit changes its current depending on the applied bias voltage VB_A or VB_B, and controls an operating state and an operation-restricted state of the column circuit connected to the current circuit. The RAMP circuit 53 generates a ramp signal VRamp that changes in signal level with time, and supplies the ramp signal VRamp to the comparator circuit of the AD conversion circuit 42. The counter signal supply circuit generates a counter signal φCo synchronized with the ramp signal VRamp, and supplies the counter signal φCo to the AD conversion circuit 42. As described above, the AD conversion circuit 42 counts a time period until the result of comparison by the comparator circuit is inverted based on the counter signal, and holds the result of counting in the memory as a digital signal.

The column circuit selection unit 6A outputs selection signals φSel1 to φSelm−1 to the current circuits for respective columns based on the control signal φSelect received from the selection control circuit 51. For example, when the selection signals φSel1 to φSelm−1 are at Low level, the current circuit supplies a current to the column circuit so that the column circuit becomes the operating state. On the other hand, when the selection signals φSel1 to φSelm−1 are at High level, the current circuit reduces the current to be smaller than that in the operating state, or interrupts the current, so that the column circuit becomes the operation-restricted state. This configuration can reduce current consumption of the column circuit.

Figure 2:
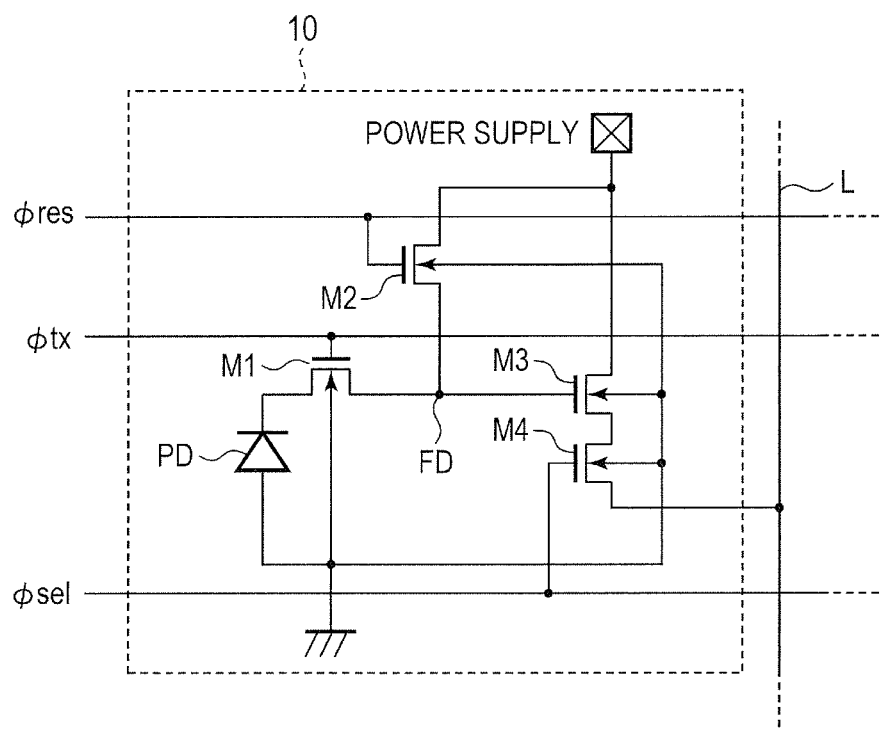
FIG. 2 is a circuit diagram of a unit pixel according to the first embodiment of the present invention.

FIG. 2 is a circuit diagram of the unit pixel 10 illustrated in FIG. 1. The unit pixel 10 includes a photoelectric conversion element PD, a transfer MOS transistor M1, a reset MOS transistor M2, an amplifier MOS transistor M3, a selection MOS transistor M4, and a floating portion (floating diffusion) FD. The photoelectric conversion element PD is formed of a photodiode, for example. The photoelectric conversion element PD converts irradiated light into electrons (electric charge). The image pickup apparatus further includes a plurality of microlenses (not shown). Each microlens is arranged correspondingly to each unit pixel 10. The drive signal φtx is applied to a gate of the transfer MOS transistor M1. When the drive signal φtx becomes High level, the transfer MOS transistor M1 transfers electrons generated in the photoelectric conversion element PD to the floating portion FD. The drive signal φres is applied to a gate of the reset MOS transistor M2. When the drive signal φres becomes High level, the reset MOS transistor M2 resets a potential of the floating portion FD to a predetermined voltage (power supply voltage). The transfer MOS transistor M1 and the reset MOS transistor M2 are simultaneously turned on to reset the electrons of the photoelectric conversion element PD. The amplifier MOS transistor M3 operates as a source follower so that a source potential of the amplifier MOS transistor M3 changes depending on the potential of the floating portion FD. The drive signal φsel is applied to a gate of the selection MOS transistor M4. When the drive signal φsel becomes High level, the selection MOS transistor M4 connects a source of the amplifier MOS transistor M3 to the vertical signal line L. The selection MOS transistor M4 in a row to be read is turned on, to thereby read a signal of the photoelectric conversion element PD in this row to the vertical signal line L. The MOS transistors M1 to M4 are not limited to N-channel MOS transistors, and may be P-channel MOS transistors. A plurality of photoelectric conversion elements PD may share one amplifier MOS transistor M3.

In a first focus detection pixel, which is a part of the focus detection pixels included in the distance measurement row, a partial region of the photoelectric conversion element PD is shielded with a light shielding film. In a second focus detection pixel, which is another part of the focus detection pixels included in the distance measurement row, another partial region of the photoelectric conversion element PD is shielded with a light shielding film so that light may enter the region in which the photoelectric conversion element PD of the first focus detection pixel is shielded from light. In other words, the photoelectric conversion element PD of the focus detection pixel has a smaller light receiving area where light enters than the photoelectric conversion element PD of the image pickup pixel. This configuration can detect a phase difference between the signal output from the first focus detection pixel and the signal output from the second focus detection pixel. The first focus detection pixel and the second focus detection pixel may be arranged in the same distance measurement row or may be arranged in different distance measurement rows. In the above description, the light shielding film is used to form the light receiving area of the photoelectric conversion element PD of the focus detection pixel so as to be smaller than that of the photoelectric conversion element PD of the image pickup pixel. As another example, the photoelectric conversion elements PD may be formed so that the photoelectric conversion element PD of the focus detection pixel may be smaller than the photoelectric conversion element PD of the image pickup pixel. Such a modification is also included in the scope of the configuration in which the light receiving area of the photoelectric conversion element of the focus detection pixel is smaller than that of the photoelectric conversion element PD of the image pickup pixel.

Figure 3:
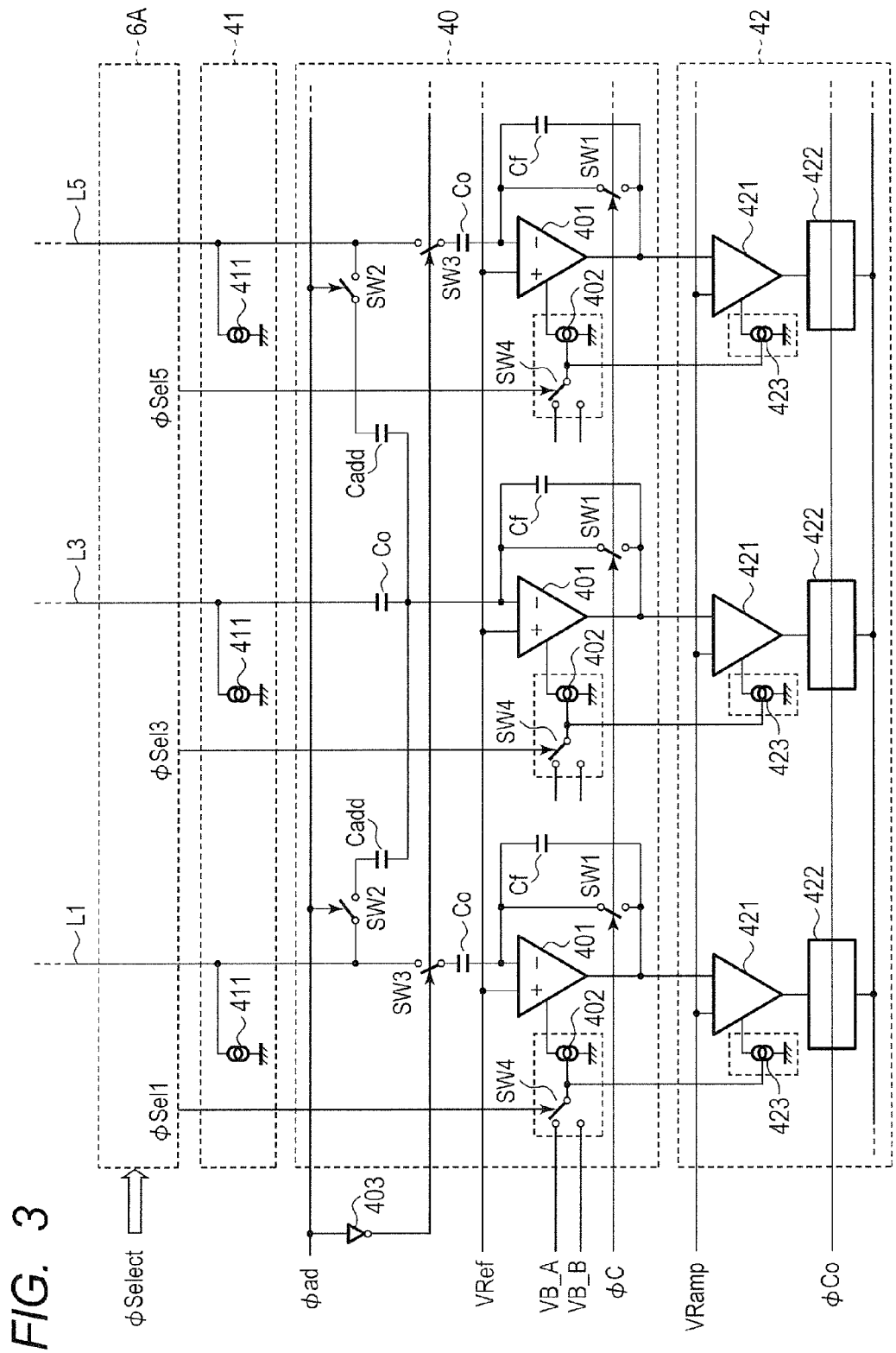
FIG. 3 is a circuit diagram of a column circuit selection unit, a current source, a column amplifier, and an AD conversion circuit according to the first embodiment of the present invention.

FIG. 3 is a circuit diagram of the column circuit selection unit 6A, the current source 41, the column amplifier 40, and the AD conversion circuit 42 in the first embodiment. The column circuit selection unit 6A, the current source 41, the column amplifier 40, and the AD conversion circuit 42 include column circuits respectively corresponding to the vertical signal lines L1, L3, . . . , Lm−1 for the odd-numbered rows. In FIG. 3, the column circuits for the vertical signal lines L1, L3, and L5 are illustrated. The other column circuits are configured in the same manner. The configuration of the column circuit for the vertical signal line L3 is mainly described below, and descriptions of the other column circuits are omitted as appropriate.

The current source 41 includes a current circuit 411. The current circuit 411 is electrically connected to the vertical signal line L3. The current circuit 411 functions as a load circuit of the amplifier MOS transistor M3 of the unit pixel 10. The column amplifier 40 includes an amplifier 401, a current circuit 402, switches SW1 to SW4, an input capacitor Co, a feedback capacitor Cf, and an additional capacitor Cadd. The amplifier 401 forms a differential amplifier circuit. An inverting input terminal of the amplifier 401 is electrically connected to the vertical signal line L3 via the input capacitor Co. The feedback capacitor Cf and the switch SW1 are electrically connected in parallel between the inverting input terminal and an output terminal of the amplifier 401. A non-inverting input terminal of the amplifier 401 is applied with a reference voltage VRef. The switch SW1 is formed of a MOS transistor. A gate of the switch SW1 is applied with a control signal φC. When the switch SW1 is turned on, the feedback capacitor Cf is reset, and the input capacitor Co is clamped to the reference voltage VRef. When the switch SW1 is turned off, the amplifier 401 amplifies a signal with a gain of (−Cf/Co).

The additional capacitor Cadd and the switch SW2 are connected between the non-inverting input terminal of the amplifier 401 for the vertical signal line L3, and the vertical signal lines L1 and L5. A gate of the switch SW2 is applied with a control signal φad for addition reading. The switch SW3 is applied with the control signal φad inverted by an inverter circuit 403. When the control signal φad becomes High level, the switch SW2 is turned on and the switch SW3 is turned off to add the signals of the vertical signal lines L1 and L5 to the signal of the vertical signal line L3. When the control signal φad becomes Low level, on the other hand, the switch SW2 is turned off and the switch SW3 is turned on to disconnect the vertical signal lines L1 and L5 from the input capacitor Co of the vertical signal line L3. The signals of the vertical signal lines L1, L3, and L5 are not added together, but the signal of the vertical signal line L3 is amplified by the amplifier 401. The amplifier 401 is supplied with an operating current from the current circuit 402.

The AD conversion circuit 42 includes a comparator 421, a digital memory 422, and a current circuit 423. The signal from the amplifier 401 is input to a first input terminal of the comparator 421, and the ramp signal VRamp is input to a second input terminal of the comparator 421. The comparator 421 compares the signal from the amplifier 401 and the ramp signal VRamp. A time period until the result of comparison is inverted is counted based on the counter signal φCo. The count value is held in the digital memory 422. In this manner, the signal from the column amplifier 40 is AD-converted. The comparator 421 is supplied with an operating current from the current circuit 423.

In this embodiment, the above-mentioned current circuits 402 and 423 are each configured to change its current based on a bias voltage applied thereto. A control portion of the current circuit 402 is connected to an output terminal of the switch SW4. Two input terminals of the switch SW4 are applied with the bias voltages VB_A and VB_B supplied from the bias circuit 52, respectively. The switch SW4 is formed of a MOS transistor. A gate of the switch SW4 is applied with the selection signal φSel3. The switch SW4 selectively supplies any one of the bias voltages VB_A and VB_B to the current circuits 402 and 423 based on the selection signal φSel3. The bias voltage VB_A is higher than the bias voltage VB_B. When the bias voltage VB_A is applied to the current circuits 402 and 423, the current circuits 402 and 423 supply a current for the operating state to the amplifier 401 and the comparator 421, respectively. For example, the current circuits 402 and 423 supply a current Ia for causing the amplifier 401 and the comparator 421 to operate normally. When the bias voltage VB_B is applied to the current circuits 402 and 423, on the other hand, the current circuits 402 and 423 supply a current for a standby state to the amplifier 401 and the comparator 421, respectively. Specifically, when the switch SW4 is connected to the bias voltage VB_B, the current circuits 402 and 423 supply a small current Ib for causing the amplifier 401 and the comparator 421 to standby. Setting the standby state can shorten a time period required for the circuit to resume to the operating state when the switch SW4 switches the applied voltage to the bias voltage VB_A. Although not illustrated, the current circuit 411 configured to supply the current to the amplifier MOS transistor M3 may be switched between the operating state and the operation standby state. Specifically, when the bias voltage VB_A is supplied to the current circuit 411, the current circuit 411 supplies the current to the amplifier MOS transistor M3 so that the amplifier MOS transistor M3 may output a signal based on photoelectric conversion. When the bias voltage VB_B is supplied to the current circuit 411, the current circuit 411 may limit the current supplied to the amplifier MOS transistor M3 so that the amplifier MOS transistor M3 may enter a state in which the operation is restricted as compared to the operating state (operation-restricted state). The bias voltage VB_B may be set to a zero voltage (GND) so that the currents of the current circuits 402, 411, and 423 may be interrupted to control the column circuit to be in a completely OFF state. Besides, the column circuit may be controlled to three states of an operating state, a standby state, and an interrupted state. Switching the current circuits 402, 411, and 423 from the operating state to the standby or OFF state as described above can reduce power consumption of the column circuit. The operation standby state or the OFF state of the column circuit is hereinafter referred to as "operation-restricted state".

As described above, the signal processing circuits 4A and 4B in this embodiment each include the current circuit capable of controlling the operation state of each column circuit to be in the operating state or the operation-restricted state. Consequently, power consumption can be controlled. Current consumption can also be controlled as appropriate depending on the specifications of the image pickup apparatus.

Figure 4:
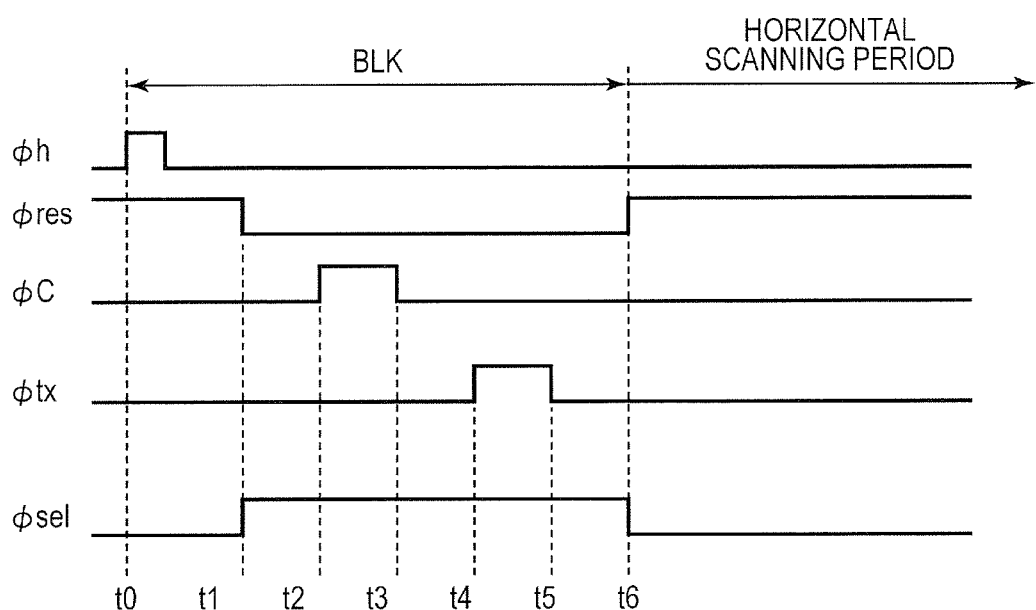
FIG. 4 is a timing chart of the unit pixel according to the first embodiment of the present invention.

FIG. 4 is a timing chart of the unit pixel, for illustrating an operation of the unit pixel for one row. A control signal φh is a horizontal synchronization signal supplied from an image pickup system (not shown) to the TG 3. In synchronization with the control signal φh, the TG 3 generates the drive signals φres, φtx, and φsel for each row, and supplies the generated drive signals to the unit pixels 10. In this manner, vertical scanning is sequentially performed for each pixel row.

As described above, the drive signal φres is applied to the gate of the reset MOS transistor M2, and the drive signal φtx is applied to the gate of the transfer MOS transistor M1. The drive signal φsel is applied to the gate of the selection MOS transistor M4. The control signal φC is applied to the gate of the switch SW1 (see FIG. 3) of the column amplifier 40. The above-mentioned signals other than the control signal φh are generated by the TG 3 and supplied to the respective circuits. The period from a time t0 to a time t6 represents a blanking period BLK. The period after the time t6 represents a horizontal scanning period.

At the time t0, the control signal φh is applied to the TG 3 to select a row to be read. At this time, the drive signal φres is at High level, and the reset MOS transistor M2 is turned on so that the floating portion FD is reset to the power supply voltage. At the time t1, the drive signal φres becomes Low level, and the reset MOS transistor M2 in the selected row is turned off so that the floating portion FD becomes a floating state. At this time, the drive signal φsel becomes High level, and the selection MOS transistor M4 in the selected row is turned on so that the vertical signal line L and the source of the amplifier MOS transistor M3 are electrically connected to each other.

At the time t2, the control signal φC becomes High level, and the feedback capacitor Cf of the column amplifier 40 is reset to an initial amplification state. At the time t3, the control signal φC becomes Low level, and the reset state of the feedback capacitor Cf is released. In the period from the time t3 to the time t4, the potential of the floating portion FD is clamped by the input capacitor Co of the downstream amplifier 401 as a signal N. At the time t4, the drive signal φtx becomes High level, and electrons generated by photoelectric conversion in the photoelectric conversion element PD are transferred to the floating portion FD.

At the time t5, the drive signal φtx becomes Low level, and the transfer MOS transistor M1 is turned off. Then, the transfer of electrons from the photoelectric conversion element PD to the floating portion FD is finished, and the potential of the floating portion FD decreases by a potential of a signal S corresponding to the transferred amount of electrons. In the period from the time t5 to the time t6, the potential of the floating portion FD is output from the amplifier MOS transistor M3 to the vertical signal line L via the selection MOS transistor M4 as a signal (N+S). The signal (N+S) is introduced to an input portion of the amplifier 401. The amplifier 401 performs differential processing between the signal N and the signal (N+S) described above, and outputs the signal S from which noise components at the time of resetting has been removed. The amplifier 401 amplifies the signal S with a gain of (−Co/Cf), and the amplified signal S is input to the comparator 421. The comparator 421 compares the ramp signal VRamp and the signal S. A time period until the result of comparison is inverted is counted based on the counter signal φCo, and the count value is held in the digital memory 422. In this manner, the signal S based on photoelectrically-converted electrons is amplified and AD-converted. The signal S may be acquired by correlated double sampling of the signal (N+S) and the signal N by a differential amplifier (not shown). Further, the signal S may be acquired by correlated double sampling after the signal (N+S) and the signal N are AD-converted. In the horizontal scanning period after the time t6, the digital signal of the AD conversion circuit 42 corresponding to the pixel signal is output from the output amplifier 45 to the outside.

Figure 5A:
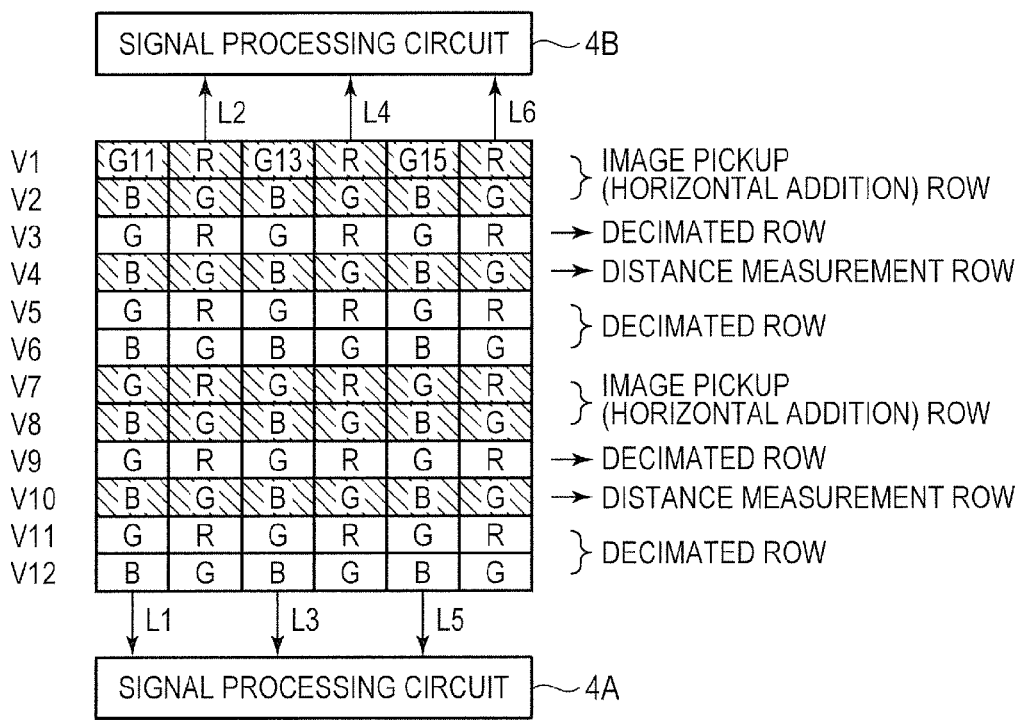
FIG. 5A and FIG. 5B are explanatory diagrams of addition reading of image pickup rows according to the first embodiment of the present invention.
Figure 5B:
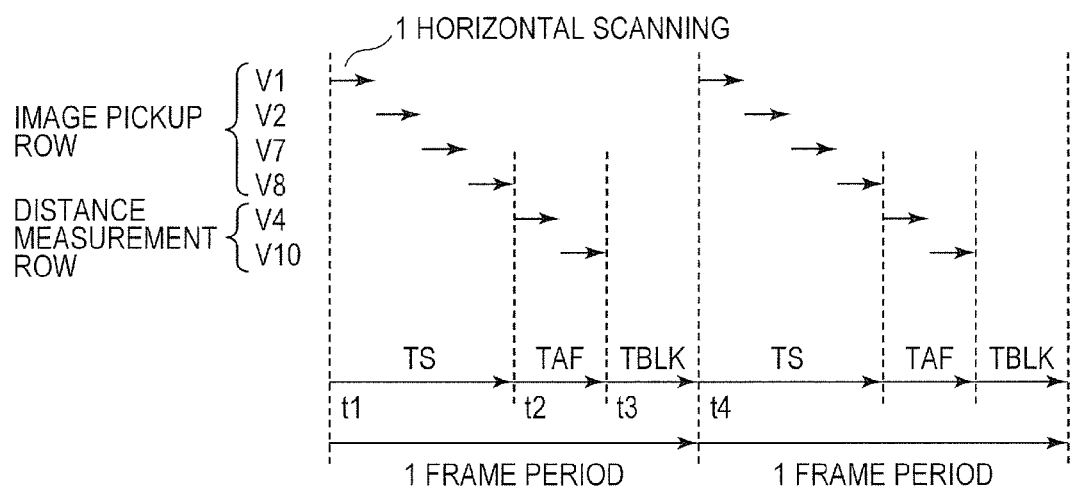

FIG. 5A and FIG. 5B are explanatory diagrams of addition reading of image pickup rows in this embodiment. FIG. 5A is an illustration of an arrangement of color filters in the pixel region 1. FIG. 5B is an illustration of drive timings for respective pixel rows. The unit pixels in 12 rows and 6 columns are illustrated in FIG. 5A for simple description, but the number of the unit pixels is not limited.

In FIG. 5A, the color filters of respective colors of red (R), green (G), and blue (B) are arranged in a mosaic pattern in accordance with a Bayer pattern. In this embodiment, the rows V1, V2, V7, and V8 are image pickup rows configured to output signals for generating an image, and the rows V3, V5, V6, V9, V11, and V12 are decimated rows not to be driven. The rows V4 and V10 are distance measurement rows configured to output focus detection signals.

Reading of image pickup rows as the first operation is performed as follows. Signals from the image pickup rows are introduced to the signal processing circuits 4A and 4B. Then, signals of the same color for three columns are added together at an input portion of the column amplifier 40. A signal addition reading method is now described by taking the row V1 and the row V2 as an example. Pixel signals G11, G13, and G15 are read from the odd-numbered columns L1, L3, and L5 to be added together in the signal processing circuit 4A. At this time, in the signal processing circuit 4A, the amplifier 401 and the comparator 421 in the column L3 are in the operating state, but the amplifiers 401 and the comparators 421 in the columns L1 and L5 are in the operation-restricted state. In other words, in FIG. 3, the selection signal φSel3 is at Low level, and the bias voltage VB_A is applied to the current circuits 402 and 423. The current circuits 402 and 423 supply the operating current Ia to the amplifier 401 and the comparator 421, respectively, and the amplifier 401 and the comparator 421 in the column L3 become the operating state. In the columns L1 and L5, on the other hand, the selection signals φSel1 and φSel5 are at High level, and the bias voltage VB_B is applied to the current circuits 402 and 423. The current circuits 402 and 423 supply a limited current Ib to the amplifiers 401 and the comparators 421 in the columns L1 and L5, respectively, and the amplifiers 401 and the comparators 421 become the operation-restricted state. As a result, current consumption during pixel addition can be reduced. The added signals are converted into digital signals by the AD conversion circuit 42 in the column L3, and are sequentially output from the horizontal scanning circuit 44.

In the even-numbered columns, three pixel signals R are read from the columns L2, L4, and L6 to be added together in the signal processing circuit 4B. At this time, in the signal processing circuit 4B, the amplifier 401 and the comparator 421 in the column L4 are in the operating state, and the amplifiers 401 and the comparators 421 in the columns L2 and L6 are in the operation-restricted state. In this manner, the signals are read from each read row in units of six columns, and the signals of each color are added together in units of three columns for each of odd-numbered columns and even-numbered columns. The same operation is performed to read the pixel signal B and the pixel signal G from the row V2. In other words, color signals corresponding to the mosaic arrangement are obtained from the two pixel rows.

In the reading of the distance measurement rows V4 and V10 as the second operation, the signals in the odd-numbered columns L1, L3, and L5 are not added together but amplified and AD-converted in the signal processing circuit 4A. Similarly, the signals in the even-numbered columns L2, L4, and L6 are not added together but amplified and AD-converted in the signal processing circuit 4B. At this time, in the signal processing circuits 4A and 4B, the amplifiers 401 and the comparators 421 in all the columns are in the operating state.

FIG. 5B is a timing chart of the addition reading of image pickup rows. The horizontal axis represents a frame period, and the vertical axis represents a pixel row to be scanned. One frame period is made up of a period TS, a period TAF, and a period TBLK. The period TS is a period for reading image pickup signals from image pickup rows (first operation). The period TAF is a period for reading distance measurement signals (second operation). The period TBLK is a blanking period for preparing for vertical scanning or the like. In FIG. 5B, the period indicated by the arrow represents one horizontal scanning period. The order of the period TS and the period TAF is not limited to the one illustrated in FIG. 5B. The period TS may be provided after the period TAF. One frame period in this embodiment is a period from when the TG 3 outputs a control signal (vertical synchronization signal) for instructing the vertical scanning circuit 2 to start vertical scanning to when the TG 3 outputs the next control signal (vertical synchronization signal).

In the period from a time t1 to a time t2, namely, the period TS, image pickup signals are read from the rows V1, V2, V7, and V8 in this order. As described above, in the image pickup rows, the signals are added together in units of three columns for each of odd-numbered columns and even-numbered columns. Specifically, when the control signal φad becomes High level, the switch SW2 is turned on and the switch SW3 is turned off, and hence the signals in the columns L1 and L5 are added to the signal in the column L3. The column circuit selection unit 6A sets the selection signal φSel3 to Low level and sets the selection signals φSel1 and φSel5 to High level. Then, the bias voltage VB_A is applied to the current circuits 402 and 423 in the column L3, and the bias voltage VB_B is applied to the current circuits 402 and 423 in the columns L1 and L5. Accordingly, the column circuit in the column L3 becomes the operating state, and the column circuits in the columns L1 and L5 become the operation-restricted state. The added signals in the column L3 are amplified and AD-converted, and are held in the digital memory 422 in the column L3.

In the period from the time t2 to a time t3, namely, the period TAF, focus detection signals are read from the distance measurement rows V4 and V10. At this time, the control signal φad becomes Low level, and hence the switch SW2 is turned off and the switch SW3 is turned on. Then, the signals in the columns L1, L3, and L5 are not added together but amplified and AD-converted independently. All the selection signals φSel1, φSel3, and φSel5 become Low level, and the bias voltage VB_A is applied to the current circuits 402 and 423 in the columns L1, L3, and L5. The column circuits in the columns L1, L3, and L5 become the operating state, and the signals in the columns L1, L3, and L5 in the distance measurement row are amplified and AD-converted to acquire the focus detection signals. The focus detection signals are used by an operation unit (not shown) to control autofocus (hereinafter referred to as "AF"). The period from the time t3 to a time t4 is a BLK period. After the BLK period has elapsed, signals for the next frame are read from the time t4.

In this embodiment, the decimated rows V3, V5, V6, V9, V11, and V12 are provided between the image pickup rows and the distance measurement rows. Providing the decimated rows in the period TS and the period TAF in this manner can shorten the read time. Further, after the plurality of image pickup rows are read, the plurality of distance measurement rows are read. In other words, the image pickup rows and the distance measurement rows are collectively read, respectively, and hence the pixel signals for distance measurement and the pixel signals for image pickup can be collectively processed, respectively, to thereby increase the speed in AF operation and image processing.

In the reading of image pickup rows, the signal processing circuits 4A and 4B are each configured to add signals of three columns in a manner that the column circuit in one column for processing the added signals is controlled to be in the operating state and the column circuits in the remaining two columns are controlled to be in the operation-restricted state. Consequently, power consumption of the image pickup apparatus can be reduced in the addition reading of image pickup rows. In the reading of distance measurement rows, on the other hand, the signal processing circuits 4A and 4B normally operate the column circuits for respective columns. In other words, the column circuits in the signal processing circuits 4A and 4B, which have been in the operation-restricted state in the reading of image pickup rows, are now controlled to be in the operating state in the reading of distance measurement rows.

In this embodiment, when a distance measurement row is located between a plurality of image pickup rows, the distance measurement row is read after or before the plurality of image pickup rows are collectively read. This configuration can reduce a standby period required for the column circuits to transition to the operating state or the operation-restricted state. For comparison, it is assumed that one image pickup row among the plurality of image pickup rows is read and then the distance measurement row is read before the next image pickup row is read. In this case, the signal processing circuits 4A and 4B are controlled to be in the operation-restricted state in the reading of the image pickup row, controlled to be in the operating state in the reading of the distance measurement row, and thereafter controlled to be in the operation-restricted state again in the reading of the image pickup row. Thus, the signal processing circuits 4A and 4B need to repeat the transition from the operating state to the operation-restricted state and the transition from the operation-restricted state to the operating state. Each transition requires a standby period until the signal processing circuits 4A and 4B perform the stable operation. According to this embodiment, on the other hand, the distance measurement row is read after or before the plurality of image pickup rows are collectively read, thereby being capable of shortening the standby period.

In the distance measurement row, an image pickup pixel may be arranged in addition to the focus detection pixels. In this case, when the signal processing unit inputs a signal of the image pickup pixel, the signal processing unit may output a signal of the image pickup pixel. In other words, in the signal reading of the distance measurement row, at least a signal of a focus detection pixel only needs to be output from the signal processing unit.

(Second Embodiment)

Figure 6A:
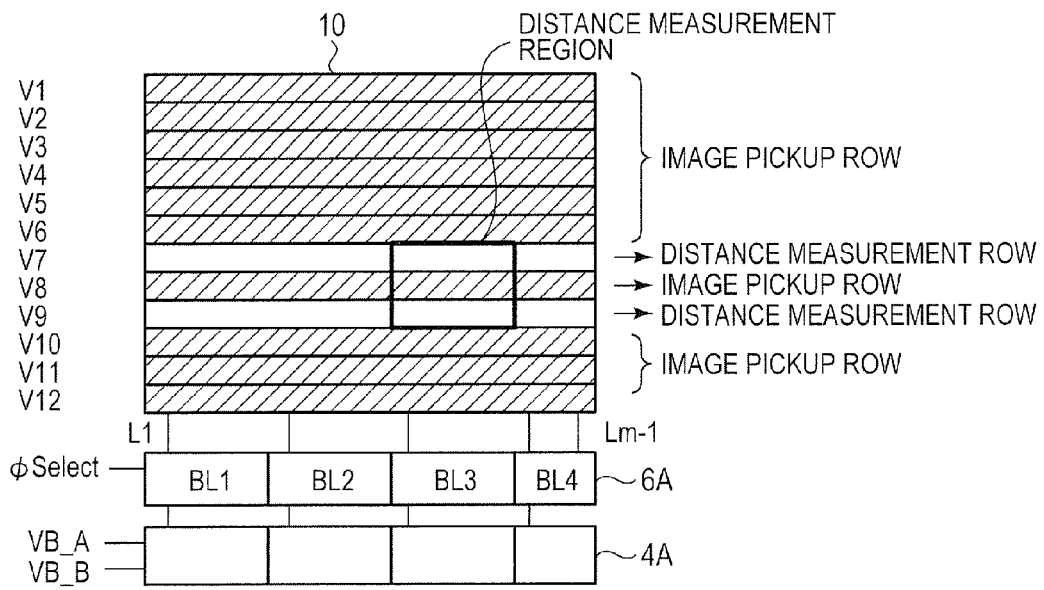
FIG. 6A and FIG. 6B are explanatory diagrams of block reading of distance measurement rows according to a second embodiment of the present invention.
Figure 6B:
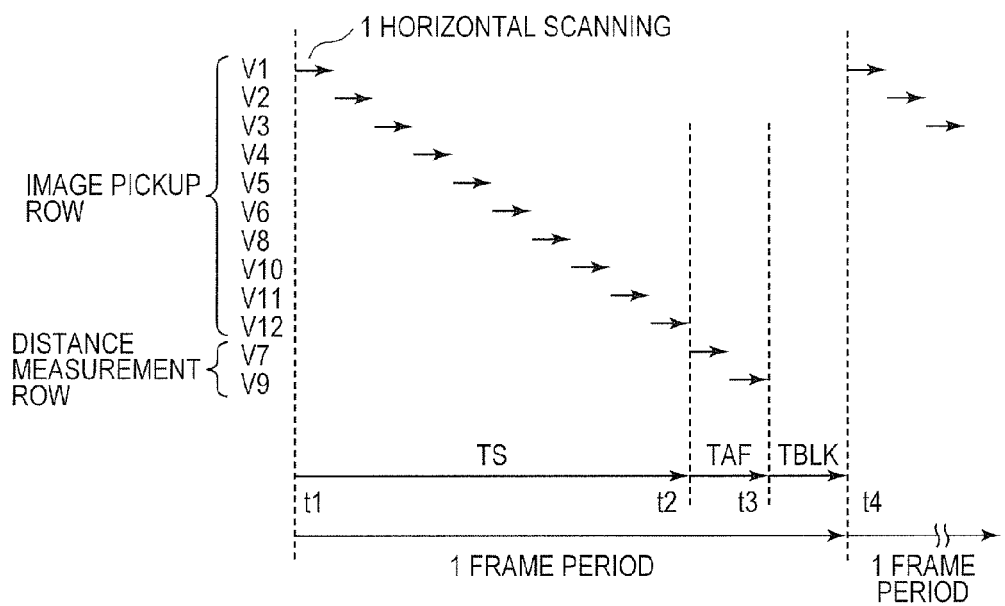

Subsequently, an image pickup apparatus according to a second embodiment of the present invention is described. In the image pickup apparatus according to this embodiment, a description of the same configurations as in the first embodiment is omitted, and different configurations are mainly described. FIG. 6A and FIG. 6B are explanatory diagrams of block reading of distance measurement rows in the second embodiment. Specifically, FIG. 6A is an illustration of a block reading region of the distance measurement rows in the pixel region 1, and FIG. 6B is an illustration of drive timings for respective pixel rows. For simple description, the rows V1 to V12, and the column circuit selection unit 6A and the signal processing circuit 4A for odd-numbered columns are mainly described below, and a description of the other configurations is omitted.

In FIG. 6A, the rows V1 to V6, V8, and V10 to V12 are image pickup rows, and the rows V7 and V9 are distance measurement rows. In this embodiment, horizontal addition is not performed in the image pickup rows, and no decimated rows are provided. Those configurations can be changed as appropriate depending on the specifications of the image pickup apparatus. The odd-numbered columns L1 to Lm−1 are divided into four blocks BL1 to BL4. The numbers of columns included in the blocks BL1 to BL4 are not limited to be equal to one another, and the blocks BL1 to BL4 may include different numbers of columns. The number of blocks is not limited to four as well. Although not illustrated, the even-numbered columns L2 to Lm are also divided into a plurality of blocks similarly to the odd-numbered columns.

The column circuit selection unit 6A outputs selection signals φSel1 to φSelm−1 for respective columns to the signal processing circuit 4A based on a control signal φSelect received from the selection control circuit 51. The column circuit selection unit 6A sets the selection signals φSel1 to φSelm−1 to High level or Low level for each block, thereby being capable of controlling the column circuits of the signal processing circuit 4A to the operating state or the operation-restricted state for each block. In this embodiment, the block BL3 for the distance measurement rows V7 and V9 is read as a distance measurement region. In the reading of the distance measurement rows, the column circuit selection unit 6A sets only the selection signals φSel for the block BL3 to Low level and sets the selection signals φSel for the other blocks BL1, BL2, and BL4 to High level. The column circuits in the block BL3 of the signal processing circuit 4A become the operating state, and the block BL3 for the distance measurement rows V7 and V9 is read as the distance measurement region. In the signal processing circuit 4A, the column circuits in the other blocks BL1, BL2, and BL4 become the operation-restricted state, thereby being capable of reducing current consumption. The distance measurement region is not limited to the block BL3, and can be arbitrarily set.

In FIG. 6B, in the period from a time t1 to a time t2, namely, a period TS, image pickup signals are read from the rows V1 to V6, V8, and V10 to V12 in this order (first operation). In this embodiment, horizontal addition is not performed in the image pickup rows, and the signal in each column is amplified and AD-converted in the signal processing circuit 4A. The column circuit selection unit 6A maintains all the selection signals φSel1 to φSelm−1 at Low level. The current circuits 402 and 423 in each column supply the operating current to the corresponding column circuit. The column circuits in the blocks BL1 to BL4 all become the operating state.

In the period from the time t2 to a time t3, namely, a period TAF, focus detection signals are read from the distance measurement region in the distance measurement rows V7 and V9 (second operation). The column circuit selection unit 6A sets the selection signals φSel in the block BL3 to Low level and sets the selection signals φSel in the other blocks BL1, BL2, and BL4 to High level. The column circuits in the block BL3 become the operating state, and the column circuits in the other blocks BL1, BL2, and BL4 become the operation-restricted state. The signals in the block BL3 corresponding to the distance measurement region in the distance measurement rows V7 and V9 are amplified and AD-converted to acquire the focus detection signals. The period from the time t3 to a time t4 is a BLK period. After the BLK period has elapsed, signals for the next frame are read from the time t4.

Consequently, in the distance measurement row signal reading according to this embodiment, only the column circuits in the block BL3 can be controlled to be in the operating state, and the column circuits in the other blocks can be controlled to be in the operation-restricted state. In other words, the column circuits can be controlled to be in the operating state or the operation-restricted state for each block, thereby being capable of reducing power consumption.

(Third Embodiment)

Figures 7A, 7B:
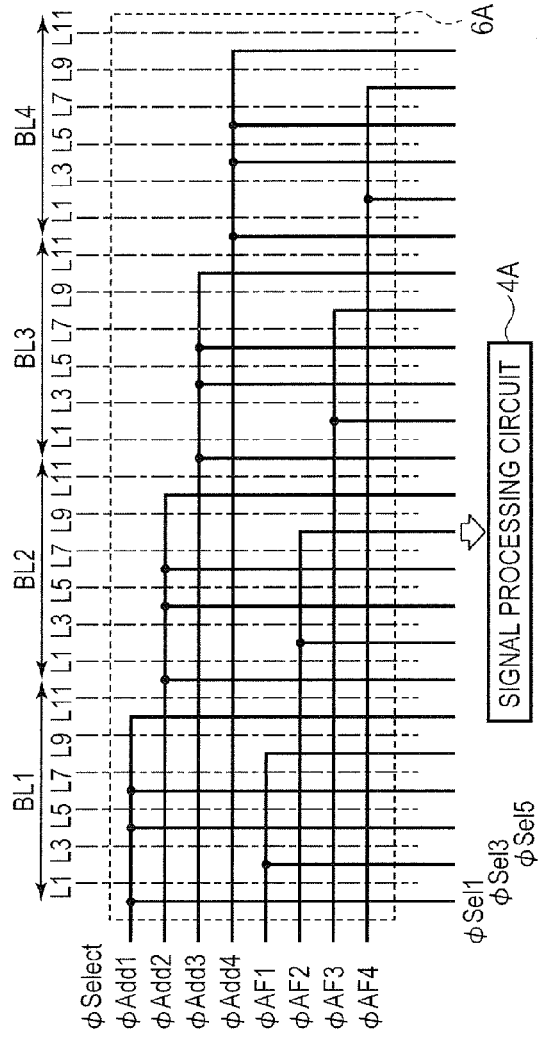
FIG. 7A and FIG. 7B are explanatory diagrams of column circuit selection according to a third embodiment of the present invention.

Subsequently, an image pickup apparatus according to a third embodiment of the present invention is described. In the image pickup apparatus according to this embodiment, a description of the same configurations as in the first and second embodiments is omitted, and different configurations are mainly described. FIG. 7A and FIG. 7B are explanatory diagrams of a column circuit selection unit 6A and control signals. The column circuit selection unit 6A in this embodiment can perform addition reading of pixel signals described in the first embodiment and block reading of distance measurement rows described in the second embodiment.

In FIG. 7A, the columns are divided into four blocks BL1 to BL4, and each block includes the columns L1, L3, ..., L11. A control signal φSelect is input from the selection control circuit 51 to the column circuit selection unit 6A. The control signal φSelect includes control signals φAdd1 to φAdd4 for addition reading and control signals φAF1 to φAF4 for block reading of distance measurement rows. The control signals φAdd1 to φAdd4 and φAF1 to φAF4 correspond to the blocks BL1 to BL4, and are supplied to the column circuits in the four blocks of the signal processing circuit 4A, respectively. Selection signals φSel1, φSel3, ..., φSel11 are output from the column circuit selection unit 6A based on the control signals φAdd1 to φAdd4 and φAF1 to φAF4. The selection signals φSel1 to φSel11 are connected to the gate of the switch SW4 of the corresponding column circuit. As described above, the switch SW4 selectively applies any one of the bias voltages VB_A and VB_B to the current circuits 402 and 423, and the current circuits 402 and 423 transition the column circuit to the operating state or the operation-restricted state.

In the block BL1 of the column circuit selection unit 6A, the control signal φAdd1 is electrically connected to the selection signals φSel1, φSel5, φSel7, and φSel11, and the control signal φAF1 is electrically connected to the selection signals φSel3 and φSel9. In the block BL2 of the column circuit selection unit 6A, the control signal φAdd2 is electrically connected to the selection signals φSel1, φSel5, φSel7, and φSel11, and the control signal φAF2 is electrically connected to the selection signals φSel3 and φSel9. Also in the blocks BL3 and BL4, the control signals φAdd3, φAdd4, φAF3, and φAF4 are electrically connected to the selection signals φSel in the same manner. Wirings between the control signals φAdd1 to φAdd4 and φAF1 to φAF4 and the selection signals φSel1 to φSel11 are appropriately changed in this manner, thereby being capable of easily realizing various reading modes suited for the specifications of the image pickup apparatus.

In FIG. 7B, the control signals in the column circuit selection unit 6A of FIG. 7A are shown. In the addition reading of image pickup rows as the first operation, the control signals φAdd1 to φAdd4 are at High level, and hence the selection signals φSel1, φSel5, φSel7, and φSel11 connected to those control signals are also at High level. Accordingly, in the blocks BL1 to BL4, the column circuits in the columns L1, L5, L7, and L11 become the operation-restricted state. The control signals φAF1 to φAF4 are at Low level, and hence the selection signals φSel3 and φSel9 connected to those control signals are also at Low level, and the column circuits in the columns L3 and L9 become the operating state. A control signal φad for the addition reading is at High level, and the SW2 is turned on and the SW3 is turned off. In the blocks BL1 to BL4, the signals in the columns L1 and L5 are added to the signal in the column L3, and the signals in the columns L7 and L11 are added to the signal in the column L9.

In the block reading of distance measurement rows as the second operation, the control signals φAF1 to φAF4 and the control signals φAdd1 to φAdd4 are controlled depending on a block to be read. For example, in the case of reading the block BL3, the control signals φAdd3 and φAF3 are set to Low level, and the other control signals φAdd1, φAdd2, φAdd4, φAF1, φAF2, and φAF4 are set to High level. Because the control signal φAF3 is at Low level, the selection signals φSel3 and φSel9 in the block BL3 are also at Low level, and the column circuits in the columns L3 and L9 in the block BL3 become the operating state. Because the control signal φAdd3 in the block BL3 is at Low level, the selection signals φSel1, φSel5, φSel7, and φSel11 are also similarly at Low level, and the column circuits in the columns L1, L5, L7, and L11 in the block BL3 become the operating state. In other words, all the column circuits in the columns L1, L3, L5, L7, L9, and L11 in the block BL3 become the operating state. In the other blocks BL1, BL2, and BL4, the control signals φAF1, φAF2, φAF4, φAdd1, φAdd2, and φAdd4 are at High level, and hence all the selection signals φSel1, φSel3, φSel5, φSel7, φSel9, and φSel11 are at High level. Accordingly, the column circuits in the blocks BL1, BL2, and BL4 except for the block BL3 become the operation-restricted state. In the block reading of distance measurement rows, the control signal φad for the addition reading is at Low level, and hence the signals are not added together.

In the block reading of distance measurement rows in this embodiment, the column circuits in blocks not to be read are controlled to be in the operation-restricted state, and hence power consumption can be reduced. A block to be read may be set in the distance measurement rows depending on a distance measurement position in a photography scene. When the image pickup apparatus has specifications that the addition reading is performed but the block reading of distance measurement rows is not performed, the control signals φAdd1 to φAdd4 may be connected by common wirings in the column circuit selection unit 6A. Wirings between the control signals φAdd1 to φAdd4 and φAF1 to φAF4 from the selection control circuit 51 and the column circuit selection unit 6A are appropriately changed, thereby being capable of controlling any column circuit to be in the operation-restricted state.

Figure 8A:
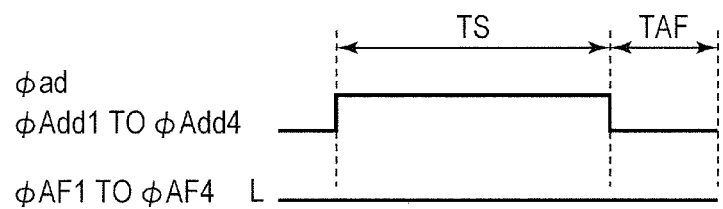
FIG. 8A and FIG. 8B are timing charts of reading according to the third embodiment of the present invention.
Figure 8B:
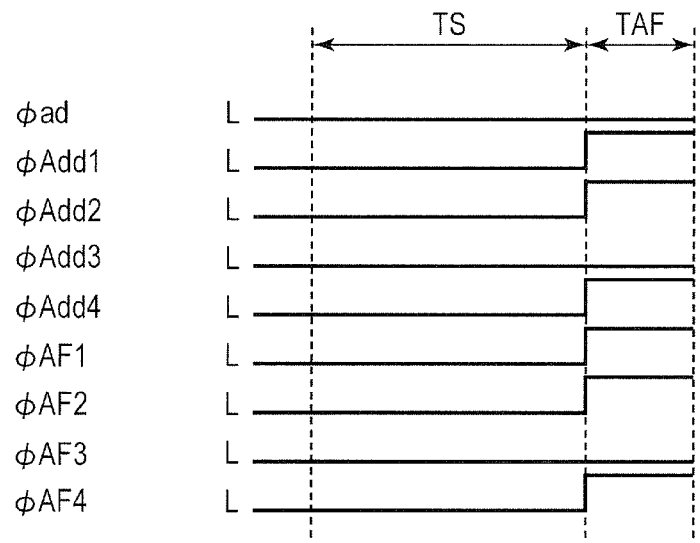

FIG. 8A and FIG. 8B are timing charts of reading in the third embodiment. Those timing charts are also applicable to the first and second embodiments. FIG. 8A is a timing chart of the addition reading of image pickup rows. A period TS is a period for the addition reading of image pickup rows, and a period TAF is a period for the reading of distance measurement rows. In the period TS, the control signals φad and φAdd1 to φAdd4 are at High level, and the control signals φAF1 to φAF4 are at Low level. Because the control signal φad is at High level, the SW2 for the addition reading is turned on and the SW3 is turned off. Then, the signals in the columns L1 and L5 are added to the signal in the column L3, and the signals in the columns L7 and L11 are added to the signal in the column L9. Because the control signals φAF1 to φAF4 are at Low level, in the blocks BL1 to BL4, the selection signals φSel3 and φSel9 become Low level and the column circuits in the columns L3 and L9 become the operating state. In each of the columns L3 and L9, the column circuit amplifies and AD-converts the added signals. Because the control signals φAdd1 to φAdd4 are at High level, the selection signals φSel1, φSel5, φSel7, and φSel11 also become High level, and the column circuits in the columns L1, L5, L7, and L11 become the operation-restricted state. This configuration can reduce current consumption in the addition reading of image pickup rows.

In the distance measurement row read period TAF, all the control signals φAdd1 to φAdd4 and φAF1 to φAF4 become Low level, and the selection signals φSel1, φSel3, φSel5, φSel7, φSel9, and φSel11 in the blocks BL1 to BL4 become Low level. Accordingly, in the blocks BL1 to BL4, the column circuits in all the columns L1, L3, L5, L7, L9, and L11 become the operating state. The control signal φad for the addition reading is at Low level, and hence the signals are not added together. Because the control signal φad is at Low level, all the column circuits in the blocks BL1 to BL4 become the operating state.

FIG. 8B is a timing chart of the block reading of distance measurement rows. In the period TS, all the control signals φAdd1 to φAdd4 and φAF1 to φAF4 become Low level, and all the column circuits in the blocks BL1 to BL4 become the operating state. The control signal φad for the addition reading is also at Low level, and hence the signals are not added together. In the period TAF, the control signals φAdd1, φAdd2, and φAdd4 and the control signals φAF1, φAF2, and φAF4 become High level, and the control signals φAdd3 and φAF3 become Low level. When the control signals φAdd3 and φAF3 become Low level, all the selection signals φSel in the block BL3 become Low level. Accordingly, the column circuits in the block BL3 become the operating state, and the column circuits in the blocks BL1, BL2, and BL4 become the operation-restricted state. This configuration can reduce current consumption in the block reading of distance measurement rows.

The image pickup apparatus may be configured to perform the addition reading of image pickup rows and the block reading of distance measurement rows in the same frame and further control the column circuits to be in the operating state or the operation-restricted state in each of the addition reading and the block reading. In other words, the control in the period TS of FIG. 8A and the control in the period TAF of FIG. 8B may be performed in the same frame.

(Fourth Embodiment)

Figure 9:
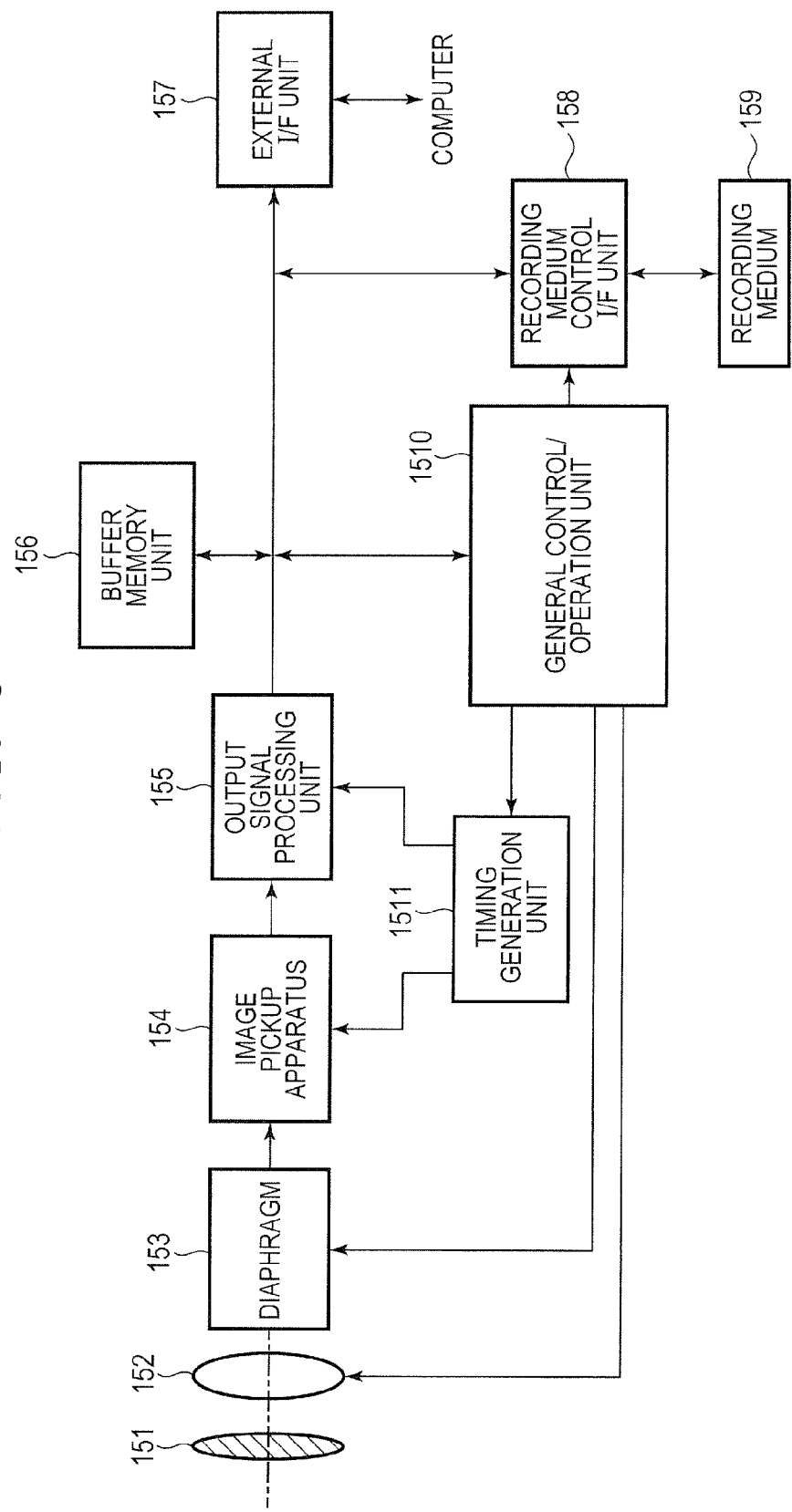
FIG. 9 is a block diagram of an image pickup system according to a fourth embodiment of the present invention.

The image pickup apparatus described in each of the above-mentioned embodiments is applicable to various kinds of image pickup systems. Examples of the image pickup systems include a digital still camera, a digital camcorder, and a monitoring camera. FIG. 9 is an illustration of an image pickup system in which the image pickup apparatus according to any one of the above-mentioned embodiments is applied to a digital still camera as an example of the image pickup system.

The image pickup system exemplified in FIG. 9 includes an image pickup apparatus 154, a barrier 151 for protecting a lens 152, the lens 152 configured to form an optical image of a subject on the image pickup apparatus 154, and a diaphragm 153 for varying an amount of light transmitted through the lens 152. The lens 152 and the diaphragm 153 are an optical system configured to condense light into the image pickup apparatus 154. The image pickup apparatus 154 is the image pickup apparatus according to any one of the above-mentioned embodiments. The image pickup system exemplified in FIG. 9 further includes an output signal processing unit 155 configured to process signals output from the image pickup apparatus 154. The output signal processing unit 155 generates an image based on the signals output from the image pickup apparatus 154. Specifically, the output signal processing unit 155 performs various kinds of correction and compression on the signals as necessary, and outputs image data. The output signal processing unit 155 further performs focus detection with the use of the signals output from the image pickup apparatus 154.

The image pickup system exemplified in FIG. 9 further includes a buffer memory unit 156 for temporarily storing the image data, and an external interface unit (external I/F unit) 157 for communicating to and from an external computer and the like. The image pickup system further includes a recording medium 159 such as a semiconductor memory for recording or reading image pickup data, and a recording medium control interface unit (recording medium control I/F unit) 158 for recording or reading the image pickup data to or from the recording medium 159. The recording medium 159 may be built in the image pickup system, or may be removably mountable from the image pickup system.

The image pickup system further includes a general control/operation unit 1510 configured to perform various kinds of operations and control the overall digital still camera, and a timing generation unit 1511 configured to output various kinds of timing signals to the image pickup apparatus 154 and the output signal processing unit 155. The timing signals and the like as used herein may be input from the outside. The image pickup system only needs to include at least the image pickup apparatus 154 and the output signal processing unit 155 configured to process the signals output from the image pickup apparatus 154.

As described above, the image pickup system in this embodiment can perform an image pickup operation by applying the image pickup apparatus 154.

(Other Embodiments)

The above-mentioned embodiments are each merely an illustrative of an embodied example for carrying out the present invention. The technical scope of the present invention therefore should not be interpreted as restrictive. In other words, the present invention can be carried out in various forms without departing from the technical ideas or main features of the present invention. For example, in the case of reading signals while decimating pixels in even-numbered columns or odd-numbered columns, one of the signal processing circuit 4A for odd-numbered columns and the signal processing circuit 4B for even-numbered columns may be controlled to be in the operating state and the other signal processing circuit may be controlled to be in the operation-restricted state.

Besides, the column circuit (signal processing unit) to be controlled to be in the operation-restricted state is not limited to the amplifier 401 or the comparator 421, and there is no limitation on the kind of column circuit as long as the column circuit is an active circuit that needs a current for driving. For example, in FIG. 3, a control unit may be provided to the current circuit 411 serving as a load of the amplifier MOS transistor of the unit pixel 10 to control the operating state and the operation-restricted state of the unit pixel 10. In other words, in block reading of distance measurement rows, the current circuit 411 in a block not to be read may be turned off.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-265516, filed Dec. 26, 2014, which is hereby incorporated by reference wherein in its entirety.

What is claimed is:

1. A method of driving an image pickup apparatus, the image pickup apparatus comprising:
    a plurality of microlenses;
    a plurality of image pickup rows, in each of which a plurality of image pickup pixels are arranged, each of the plurality of image pickup pixels comprising a photoelectric conversion element that is arranged correspondingly to one of the plurality of microlenses, and being configured to output a signal for generating an image;
    a distance measurement row, in which a plurality of focus detection pixels are arranged, each of the plurality of focus detection pixels comprising a photoelectric conversion element that is arranged correspondingly to one of the plurality of microlenses and that has a smaller light receiving area than the photoelectric conversion element included in the image pickup pixel, and being configured to output a focus detection signal; and
    a plurality of signal processing units, to each of which signals of the plurality of focus detection pixels and the plurality of image pickup pixels are output,
    the method comprising:
    performing a first operation of reading signals from the plurality of image pickup rows to the plurality of signal processing units;
    performing, before or after the first operation, a second operation of reading signals from the distance measurement row to the plurality of signal processing units;
    controlling the plurality of signal processing units to be in an operating state in one of the first operation and the second operation;
    controlling a part of the plurality of signal processing units to be in an operation-restricted state in another of the first operation and the second operation, wherein the method of driving an image pickup apparatus;
    adding signals of image pickup pixels in a plurality of columns together in the first operation;
    controlling, in the first operation, one of the plurality of signal processing units that processes the added signals to be in the operating state, and controlling another of the plurality of signal processing units to be in the operation-restricted state; and
    controlling the another of the plurality of signal processing units to be in the operating state in the second operation.

2. A method of driving an image pickup apparatus, the image pickup apparatus comprising:
    a plurality of microlenses;
    a plurality of image pickup rows, in each of which a plurality of image pickup pixels are arranged, each of the plurality of image pickup pixels comprising a photoelectric conversion element that is arranged correspondingly to one of the plurality of microlenses, and being configured to output a signal for generating an image;
    a distance measurement row, in which a plurality of focus detection pixels are arranged, each of the plurality of focus detection pixels comprising a photoelectric conversion element that is arranged correspondingly to one of the plurality of microlenses and that has a smaller light receiving area than the photoelectric conversion element included in the image pickup pixel, and being configured to output a focus detection signal; and
    a plurality of signal processing units, to each of which signals of the plurality of focus detection pixels and the plurality of image pickup pixels are output,
    the method comprising:
    performing a first operation of reading signals from the plurality of image pickup rows to the plurality of signal processing units;
    performing, before or after the first operation, a second operation of reading signals from the distance measurement row to the plurality of signal processing units;
    controlling the plurality of signal processing units to be in an operating state in one of the first operation and the second operation;
    controlling a part of the plurality of signal processing units to be in an operation-restricted state in another of the first operation and the second operation, wherein the method of driving an image pickup apparatus;
    controlling, in the second operation, one of the plurality of signal processing units that corresponds to pixels in a block corresponding to a distance measurement region to be in the operating state, and another of the plurality of signal processing units to be in the operation-restricted state; and
    controlling, in the first operation, the another of the plurality of signal processing units to be in the operating state, which is controlled to be in the operation-restricted state in the second operation.

3. A method of driving an image pickup apparatus, the image pickup apparatus comprising:
    a plurality of microlenses;
    a plurality of image pickup rows, in each of which a plurality of image pickup pixels are arranged, each of the plurality of image pickup pixels comprising a photoelectric conversion element that is arranged correspondingly to one of the plurality of microlenses, and being configured to output a signal for generating an image;
    a distance measurement row, in which a plurality of focus detection pixels are arranged, each of the plurality of focus detection pixels comprising a photoelectric conversion element that is arranged correspondingly to one of the plurality of microlenses and that has a smaller light receiving area than the photoelectric conversion element included in the image pickup pixel, and being configured to output a focus detection signal; and
    a plurality of signal processing units, to each of which signals of the plurality of focus detection pixels and the plurality of image pickup pixels are output,
    the method comprising:
    performing a first operation of reading signals from the plurality of image pickup rows to the plurality of signal processing units;
    performing, before or after the first operation, a second operation of reading signals from the distance measurement row to the plurality of signal processing units;
    controlling the plurality of signal processing units to be in an operating state in one of the first operation and the second operation; and
    controlling a part of the plurality of signal processing units to be in an operation-restricted state in another of the first operation and the second operation,
    wherein each of the plurality of focus detection pixels and the plurality of image pickup pixels comprises:
    a photoelectric conversion element configured to generate an electric charge based on light; and an amplifier MOS transistor configured to output a signal based on the electric charge, wherein each of the plurality of signal processing units comprises a current circuit configured to supply a current to the amplifier MOS transistor, wherein the operating state of the plurality of signal processing units comprises a state in which the current circuit supplies a current to the amplifier MOS transistor to enable the amplifier MOS transistor to output the signal, and wherein the operation-restricted state of the part of the plurality of signal processing units comprises a state in which the current supplied from the current circuit to the amplifier MOS transistor is suppressed as compared to the operating state.

4. An image pickup apparatus, comprising:
a plurality of microlenses;
a plurality of image pickup rows, in each of which a plurality of image pickup pixels are arranged, each of the plurality of image pickup pixels comprising a photoelectric conversion element that is arranged correspondingly to one of the plurality of microlenses, and being configured to output a signal for generating an image;
a distance measurement row, in which a plurality of focus detection pixels are arranged, each of the plurality of focus detection pixels comprising a photoelectric conversion element that is arranged correspondingly to one of the plurality of microlenses and that has a smaller light receiving area than the photoelectric conversion element included in the image pickup pixel, and being configured to output a focus detection signal;
a plurality of signal processing units, to each of which signals of the plurality of focus detection pixels and the plurality of image pickup pixels are output; and
a control unit, the control unit being configured to:
  control the plurality of image pickup rows to perform a first operation of reading signals to the plurality of signal processing units;
  control, before or after the first operation, the distance measurement row to perform a second operation of reading signals to the plurality of signal processing units;
  control the plurality of signal processing units to be in an operating state in one of the first operation and the second operation;
  control a part of the plurality of signal processing units to be in an operation-restricted state in another of the first operation and the second operation;
  add signals of image pickup pixels in a plurality of columns together in the first operation;
  control, in the first operation, one of the plurality of signal processing units that processes the added signals to be in the operating state, and controlling another of the plurality of signal processing units to be in the operation-restricted state; and
  control the another of the plurality of signal processing units to be in the operating state in the second operation.

5. An image pickup system, comprising:
an image pickup apparatus comprising:
  a plurality of microlenses;
  a plurality of image pickup rows, in each of which a plurality of image pickup pixels are arranged, each of the plurality of image pickup pixels comprising a photoelectric conversion element that is arranged correspondingly to one of the plurality of microlenses, and being configured to output a signal for generating an image;
  a distance measurement row, in which a plurality of focus detection pixels are arranged, each of the plurality of focus detection pixels comprising a photoelectric conversion element that is arranged correspondingly to one of the plurality of microlenses and that has a smaller light receiving area than the photoelectric conversion element included in the image pickup pixel, and being configured to output a focus detection signal;
  a plurality of signal processing units, to each of which signals of the plurality of focus detection pixels and the plurality of image pickup pixels are output; and
  a control unit, the control unit being configured to:
    control the plurality of image pickup rows to perform a first operation of reading signals to the plurality of signal processing units;
    control, before or after the first operation, the distance measurement row to perform a second operation of reading signals to the plurality of signal processing units;
    control the plurality of signal processing units to be in an operating state in one of the first operation and the second operation;
    control a part of the plurality of signal processing units to be in an operation-restricted state in another of the first operation and the second operation;
    control, in the second operation, one of the plurality of signal processing units that corresponds to pixels in a block corresponding to a distance measurement region to be in the operating state, and another of the plurality of signal processing units to be in the operation-restricted state; and
    control, in the first operation, the another of the plurality of signal processing units to be in the operating state, which is controlled to be in the operation-restricted state in the second operation; and
an output signal processing unit configured to process signals output from the image pickup apparatus, to thereby generate an image.

6. An image pickup apparatus, comprising:
a plurality of microlenses;
a plurality of image pickup rows, in each of which a plurality of image pickup pixels are arranged, each of the plurality of image pickup pixels comprising a photoelectric conversion element that is arranged correspondingly to one of the plurality of microlenses, and being configured to output a signal for generating an image;
a distance measurement row, in which a plurality of focus detection pixels are arranged, each of the plurality of focus detection pixels comprising a photoelectric conversion element that is arranged correspondingly to one of the plurality of microlenses and that has a smaller light receiving area than the photoelectric conversion element included in the image pickup pixel, and being configured to output a focus detection signal;
a plurality of signal processing units, to each of which signals of the plurality of focus detection pixels and the plurality of image pickup pixels are output; and a control unit, the control unit being configured to:
  control the plurality of image pickup rows to perform a first operation of reading signals to the plurality of signal processing units;
  control, before or after the first operation, the distance measurement row to perform a second operation of reading signals to the plurality of signal processing units;
  control the plurality of signal processing units to be in an operating state in one of the first operation and the second operation;
  control a part of the plurality of signal processing units to be in an operation-restricted state in another of the first operation and the second operation;
  control, in the second operation, one of the plurality of signal processing units that corresponds to pixels in a block corresponding to a distance measurement region to be in the operating state, and another of the plurality of signal processing units to be in the operation-restricted state; and
  control, in the first operation, the another of the plurality of signal processing units to be in the operating state, which is controlled to be in the operation-restricted state in the second operation.

* * * * *